Feb. 3, 1959  P. DUPONT  2,871,575
APPARATUS FOR THE PNEUMATIC TREATMENT OF GRANULAR
MATERIALS, PARTICULARLY FERTILIZERS
Filed Feb. 10, 1956
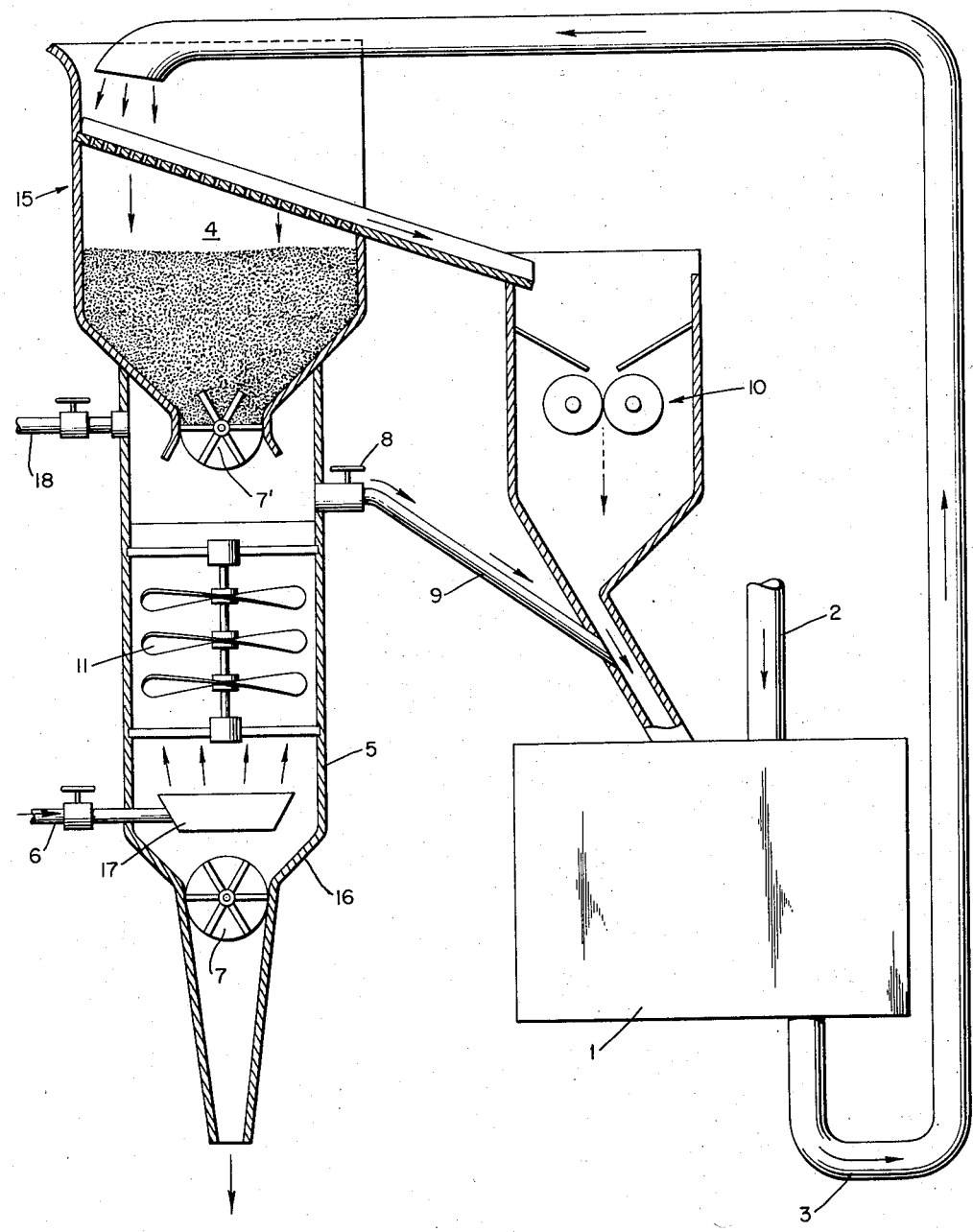
INVENTOR.
PAUL DUPONT
BY
Bauer and Seymour
ATTORNEYS

United States Patent Office 2,871,575
Patented Feb. 3, 1959

2,871,575

APPARATUS FOR THE PNEUMATIC TREATMENT OF GRANULAR MATERIALS, PARTICULARLY FERTILIZERS

Paul Dupont, Paris, France, assignor to Societe Anonyme des Manufactures des Glaces et Produits Chimiques de Saint-Gobain, Chauny & Cirey, Paris, France Application February 10, 1956, Serial No. 564,799

Claims priority, application France February 12, 1955

1 Claim. (Cl. 34—57)

This invention relates to the manufacture of fertilizer, particularly to the drying and classification of fertilizer particles, and in a broader sense to the gaseous treatment of granular materials in general, particularly to the gaseous treatment of granular materials which are moist, have some tendency to agglomerate, and which must be separated into categories of different size for commercial or other purposes. Inasmuch as the fertilizer industry has material problems of this sort the invention will be described in its relation to that industry.

Fertilizers, having been made as sludge or paste, are then granulated and sized. The sizing includes separation into particles of size which are desirable for commercial purposes, gross sizes, larger than that which is chosen as the upper limit for the particular commercial product, and fines, which are below the smallest diameter to be included in the commercial product. The fines and the gross have, in one way or another, been returned to the process. The fines are frequently used to seed the sludge and thus to initiate the granulation; the gross particles are sometimes broken in crushers and similarly returned, or treated in other ways. The present invention deals with the process from the step of granulation onward, and involves novel concepts in the cooling and drying of the granular material, in preventing the granules from agglomerating, in classifying the granulated material, that is in separating it into particles according to size, and in the thermal efficiency of the drying processes.

There is described in the French patent identified as Ruhrchemie 1,010,459, delivré March 26, 1952, a process in which fertilizers are cooled and dried by blowing air through a moving stream of the fertilizer. In an improvement on that invention, illustrated in the patent, identified as Ruhrchemie 1,032,454, delivré March 25, 1953, certain imperfections in the earlier process were recognized and corrected. They discovered that, if one increased the pressure of the gas which was blown through the granular fertilizer until the gaseous stream tended to buoy the granular material upward and in an amount from 20 to 50% of the weight of the material, a better cooling and drying was accomplished. They also suggested that the pressure could be raised until the weight of the grains was almost totally balanced by the gas pressure, but they expressly provided that the fluidification of the grains, that is, the increasing of gas pressure until the weight of the grains is actually balanced by the pressure of the gas, must be avoided. They state that the process cannot be controlled when such gas pressures are applied.

It is an object of the present invention to improve the cooling, drying and classification of hot, moist granular materials, particularly those which have a tendency to agglomerate in their warm or moist states. The invention is particularly applicable to the manufacture of fertilizer, producing exceptional advantages in that industry.

It is an object of the invention to improve the thermal exchange in those portions involving the cooling and drying of the granular material by a gas in such manner that the temperature of the air blown through the granular material can be chosen such that it is only several degrees lower in temperature at its point of admission than the temperature of the granular material at its point of discharge. Heretofore, a relatively wide difference in temperature was necessary. This improvement is of the greatest possible benefit, since it allows the process to be carried out more economically and efficiently.

Another object of the invention is to improve the classification of such granular materials and to eliminate some of the cumbersome heavy machinery which is customarily employed for classifying the grains. Standard procedure requires a plurality of screens of different sizes, which have a tendency to become clogged and hence to depart from size. The present invention reduces the number of screens and limits the kind of screens which need be employed in such industries.

Another object of the invention is to improve the contact of the air with the granular materials during the drying operation. Heretofore, when agglomeration set in, the blasts of air were not sufficient in intensity to break up such agglomerated particles, or to prevent such agglomeration. The present invention involves not only the blowing of air through the material for purposes of drying, and cooling, but the simultaneous use of the blast of air for separation of fines. In its preferred form, mechanical agitation is simultaneously used. By this combined mechanical and pneumatic action the bed of granules is maintained in a state of turbulence which applies to all the particles in it. Whereas the channeling of air flow has been observed in the prior art use of air flow, no such channeling is present in the improved system.

Whereas the patents referred to stopped short of actual fluidification of the bed, the velocity of air being kept at a stage less than that required to neutralize the weight of the particles, and preferably to a flow of from 20 to 50% of that value, I have discovered that, in the manufacture of fertilizer, when carried out as set forth in this application, material advantages are obtained by maintenance of air flow at an intensity sufficient to separate the particles from each other, and to blow out the fines. These advantages are enhanced by the fact that in my process the fines are accurately separated from larger sized particles by the blast of air.

It is standard practice to cool fertilizer before storage, particularly fertilizer granules, to prevent a rise in temperature and an agglomeration of the product by the phenomena of crystallization which tends to produce them. In order to overcome these inconveniences, it usually was sufficient to cool the fertilizer below the point of hygroscopic transformation of the fertilizer constituents. For example, for fertilizer containing ammonium nitrate, a cooling below 30° C. before storage was considered sufficient. Up to the present time, this cooling has been practiced at the place of discharge from the granulator, in rotary cylinders, having a horizontal axis or one somewhat inclined to the horizontal, in which the product is tumbled about. These cylinders are traversed by a current of cold air. The apparatus for carrying out that cooling presents a number of imperfections because of the conditions of working, and the low ratio of size to quantity of material handled, which obliges one to use voluminous and costly apparatus if one wishes to attain a reasonable rate of production. This also entails the excessive use of space, and the tying up of material and capital to an undesirable extent. Furthermore, the tumbling of the grains, which are still tacky, over each other tends to induce agglomerations, that is to say, a change in the granular nature of the product being treated. Particularly, as on the one hand it is desired most frequently to cool a relatively hot product down to a temperature on the order of 30°, that is to say, a little above room temperature, and on the other hand the cold gas only effectively reaches the upper surface of the bed of granules, the thermal exchange is bad enough and it requires one, particularly in summer, to employ air which has been previously artificially refrigerated, which still further complicates the process and increases the quantity of capital and machinery employed.

The process of the present invention in its preferred form comprises arranging the fertilizer, which is to be cooled, in the form of a bed of material thickness, such as a vertical column, mechanically agitating it and at the same time insufflating it by means of a gaseous current at a temperature lower than that of the granules, the speed of the current of gas being sufficient to separate the grains from each other and to remove fine particles. The gross are preferably separated from the commercial size and fines in a preliminary step.

When the grains of material which are being dried have a tendency to agglomerate, the speed of the gaseous current should be such that it will provoke a veritable turbulenec of the mass of grains in the column. This state is the more readily attained, and the channeling of the air is effectively overcome, by the joint use of the mechanical agitator and the insufflation by air. In the form of the invention shown in the drawing a rotary agitator of paddle-type has been found effective.

This invention has the advantage of assuring the best possible contact between the grains and the cooling blast, so that the efficiency is increased and the size of the apparatus may be reduced. Thermal exchange being thus favored, one may use as the cooling fluid a gas of which the temperature is only slightly inferior to that at which the product issues from the apparatus. Particularly, experience shows that the cost of installation, and of operation of a vertical fixed tube, such as that used in the form of the invention shown in the drawing, are less than those required for the use of rotary cylinders.

The size of the grains is not changed by the passage through the cooling and drying mechanism of this invention, although some change occurs in rotary driers, and the granulated fertilizers issuing from the apparatus may be sent directly to storage. It is relatively dust-free.

According to this invention, I eliminate the gross by a screening preliminary to the insertion of the product into the vertical tube for blowing. This preliminary screening can be carried out on a small single screen of large apertures. The particles which pass through the screen include commercial sizes and fines, and preferably only these are subjcted to the cooling operation. This is a very practical part of the invention because it makes it unnecessary to cool the large particles, which are the more difficult to cool as their size is larger.

As the gross grains, or their material, is to be returned to an earlier stage of the process, either with or without breaking up into smaller particles, in the preferred form of the invention, it is a material saving and introduces an improvement into the grinding and cooling operations to eliminate drying and cooling them. The grains which are too fine to be desired in the final product may be removed by the blast of air which is used for cooling and drying, passing off at the upper part of the tube and being recycled to an earlier stage in the process, particularly to the granulator where they may be used for seeding.

The vertical tube which supports the column of granules is provided at the upper part with appropriate means permitting the admission of granules to replace those which are dried and removed at the bottom, and with appropriate means for allowing the air to flow off and to carry with it the fines. The apparatus at the bottom of the tube, which discharges the dried material, operates at the same rate as the rate of admission so that there is always a column of granular material of approximately uniform height.

In the prior art the separation of the fines was obtained by screens of fine dimension and high cost, which were particularly subject to the stoppage and size reduction of their holes by plugging. In the present invention the separation of the fines is accomplished without additional cost, by the same gas which accomplishes the cooling and drying, thus saving the capital charges for machinery and the cost of maintaining the operation of fine screens.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention. Reference for this latter purpose being had primarily to the appended claim.

The accompanying drawing shows schematically a preferred apparatus for the drying and cooling of the fertilizer grains by the process of the invention. On this drawing the numeral 1 represents a granulator which is supplied through conduit means 2 from fertilizer manufacturing steps carried on in apparatus not shown and which may be any type of process which is used for the production of sludges which can be granulated. From the granulator 1 the granulated material, still hot and moist, passes to a screen 4, which is provided with apertures of size which retain on the screen only those particles which are too large to be incorporated in the commercial product, that is to say the gross. These particles roll down the face of the screen to a crusher 10 where they are reduced in size and passed back to the granulator. The cycling to this particular stage is not essential, as they can be recycled to other stages with or without crushing in accordince with the teaching of an application now pending, which has not yet been patented. The medium sized and fine particles pass through the screen and into a hopper 15, from whence they drop into a vertical tube 5 which is provided with a mechanical agitator 11 of paddle-type, rotatable by means not shown. The tube 5 is provided at its bottom with a hopper 16 closed by a rotary discharge valve 7 which discharges the fertilizer at regular intervals. As such discharge means is known it is not described in detail. The rate of admission of material at the top and of discharge at the bottom of the tube 5 are correlated so that the bed of granular material is maintained at even depth in the tube. A pipe 6 enters through the side of the tube and is provided with a head 17 through which a blast of air is driven upward through the column of granules in the tube. The bottom of the funnel 15 is supplied with the same type of feeding device 7' as is found at the bottom of the tube so that the regular operation of these devices admits and discharges the same amounts of material at the same time. At the same time, the air admitted through the tube through head 17 passes upward through the granular material and out at orifice 18 with the fines, orifice 8 then being closed. The fines are taken from orifice 18 and are separated by the air and return to another part of the process, not shown. The combination of the rotary agitator 11 with the blast of air vastly improves the uniformity and the speed of the drying and prevents the formation of agglomerates. If it is not desired to transport the fines through orifice 18 to another portion of the system, orifice 18 is then closed, orifice 8 is opened, and the fines are taken off through conduit 9 and admitted to the granulator 1 as seeding material.

*Example 1*

For example, a commercial installation for the manufacture of fertilizer included a column of 1.9 meters diameter and 1.5 meters height to which one introduced 15 tons per hour of a complex granulated fertilizer, including 12% of ammonium nitrate nitrogen, 12% of $P_2O_5$, from bicalcium phosphate, and 20% $K_2O$. This had been screened through a screen of 4 mm. mesh which removed all particles above that size. The temperature of admission was 62° C. The bulk of the fertilizer, after the separation of the gross particles, over 4 mm., included 10 tons of product in grain sizes superior to 2 mm. and 5 tons of finer grains. The extractor placed at the bottom of the column was regulated to discharge 10 tons per hour of product. The column received 13,000 cu. meters of air at 27° C. per hour, which was evacuated at the upper part of the column through pipe 8 at 60° C. Five tons per hour of fines were eliminated by this kind of air. The temperature of the fines was 40° C. and they were recycled through the granulator. At the base of the column the fertilizer which was discharged was free of particles less than 2 mm. and was sent to storage at a temperature of 30° C. I regard the accurate classification as an astonishing feature of the invention.

In such process there was only a difference in temperature of 3° between the air which was admitted for cooling purposes and the temperature of the fertilizer which issued at the bottom of the column. With fertilizer manufacturing apparatus of the prior art, it was necessary in cooling a like mass of fertilizer from 62° to 30° to use air which had been chilled to a temperature of 15° C.

*Example 2*

The same apparatus was used with equally excellent results in the production of a fertilizer titrating 9% of nitrogen from ammonium nitrate, 9% of $P_2O_5$ from super phosphate, and 12% of $K_2O$.

In case it is desired to dry and cool the gross such can be more efficiently done after separation from the fines and medium sized particles.

As many apparently widely different embodiments of the present invention may be made without departing from the spirit and scope thereof, it is to be understood that the invention is not limited to the specific embodiments.

What is claimed is:

Apparatus for making fertilizer comprising a granulator, a coarse screen, means to transfer fertilizer granules from the granulator to the coarse screen, means to crush the gross particles from the coarse screen, means to recycle crushed material, means to transfer the granules that have passed through the screen to the top of a column, means to agitate the granules in the column, means to insufflate the column with air, means to discharge material from the bottom of the column, and means to recycle the fines from the top of the column.

References Cited in the file of this patent
UNITED STATES PATENTS

| | | |
|---|---|---|
| 1,868,512 | Ahlmann | July 26, 1932 |
| 2,602,242 | Dok | July 8, 1952 |
| 2,766,534 | Schaub et al. | Oct. 16, 1956 |